(12) United States Patent
Kasiraj et al.

(10) Patent No.: US 8,786,969 B2
(45) Date of Patent: Jul. 22, 2014

(54) SHINGLED RECORDING SYSTEMS USING MULTIPLE PASS WRITE, SINGLE PASS READ ARCHITECTURE

(75) Inventors: Prakash Kasiraj, San Jose, CA (US); Thomas R. Albrecht, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 187 days.

(21) Appl. No.: 13/251,031

(22) Filed: Sep. 30, 2011

(65) Prior Publication Data

US 2013/0083416 A1  Apr. 4, 2013

(51) Int. Cl.
*G11B 20/10* (2006.01)

(52) U.S. Cl.
USPC .......................................................... 360/39

(58) Field of Classification Search
None
See application file for complete search history.

(56) References Cited

U.S. PATENT DOCUMENTS

| | | | |
|---|---|---|---|
| 6,516,426 B1 | 2/2003 | Forehand et al. | |
| 6,937,421 B2 | 8/2005 | Rubin et al. | |
| 7,133,241 B2 | 11/2006 | Che et al. | |
| 7,317,596 B2* | 1/2008 | Albrecht et al. | 360/319 |
| 7,408,731 B2 | 8/2008 | Uemura et al. | |
| 7,443,630 B2 | 10/2008 | Lengsfield, III et al. | |
| 7,787,208 B2 | 8/2010 | Min et al. | |
| 2007/0091499 A1* | 4/2007 | Saliba | 360/77.12 |
| 2007/0242376 A1* | 10/2007 | Nakagawa et al. | 360/39 |
| 2007/0242378 A1* | 10/2007 | Ikegami et al. | 360/39 |
| 2007/0258161 A1* | 11/2007 | Richter et al. | 360/48 |
| 2008/0204915 A1* | 8/2008 | Albrecht et al. | 360/48 |
| 2008/0266697 A1 | 10/2008 | Ohta et al. | |
| 2009/0067078 A1* | 3/2009 | Min et al. | 360/48 |
| 2009/0153998 A1 | 6/2009 | Nakamura et al. | |
| 2010/0007984 A1* | 1/2010 | Nakagawa | 360/75 |
| 2010/0020435 A1 | 1/2010 | Chen et al. | |
| 2010/0103554 A1 | 4/2010 | Izumi | |
| 2010/0110575 A1 | 5/2010 | Gao | |
| 2010/0232057 A1 | 9/2010 | Sanvido et al. | |
| 2012/0060073 A1* | 3/2012 | Itakura et al. | 714/758 |
| 2012/0099216 A1* | 4/2012 | Grobis et al. | 360/39 |
| 2012/0224277 A1* | 9/2012 | Steiner et al. | 360/32 |

FOREIGN PATENT DOCUMENTS

JP  2003151103 A  5/2003

* cited by examiner

*Primary Examiner* — Thang Tran
(74) *Attorney, Agent, or Firm* — Zilka-Kotab, PC (57) ABSTRACT

In one embodiment, a magnetic data storage system includes a bit patterned magnetic medium, wherein centers of bits in adjacent data tracks do not lie on a common line in a cross-track direction, a magnetic head having a writer element having a width greater than a width of a data track in a track width direction adapted for writing data successively to at least two adjacent data tracks of the magnetic medium, and a reader element having a width larger than the width of a data track in the track width direction adapted for reading data concurrently from the at least two adjacent data tracks of the magnetic medium in a single pass, a drive mechanism for passing the magnetic medium over the magnetic head, and a controller electrically coupled to the magnetic head for controlling operation of the magnetic head.

24 Claims, 9 Drawing Sheets

SHINGLED RECORDING SYSTEMS USING MULTIPLE PASS WRITE, SINGLE PASS READ ARCHITECTURE

FIELD OF THE INVENTION

The present application relates to magnetic storage media, and more particularly to shingled recording systems employing multiple pass write, single pass read architecture.

BACKGROUND

As magnetic storage technology is pushed to increase the capacity of magnetic media, such as hard disk drives (HDDs), the spacing of the data tracks is becoming less and less. This puts a constraint on the component technology used to both write the data (writer element) and read the data back (sensor element). In the case of writing the data, this constraint has led to shingled magnetic recording (SMR) where writing is performed in a path wider than the actual data track, an offset of the writer is introduced by one track position, and writing is performed again.

SMR is a recording system that offers higher areal density than other conventional designs. In conventional SMR systems, a main pole of a magnetic head is used to write tracks in a shingled arrangement, progressively overlaying a portion of a previously recorded track when a new track is recorded, hence the descriptive name, such that recording is performed with overlapping tracks. Consequently, the actual tracks are recorded using track edge portions of the main pole, so the recording characteristics of the main pole track edge are somewhat determinative of overall system performance. That is to say, it is of great utility to improve the field gradient in the cross-track direction and furthermore to improve the field gradient in the down-track direction, particularly at a position of the magnetic head corresponding to the track edge.

Bit patterned recording (BPR) technology is intrinsically a low bit aspect ratio (BAR) technology that uses high data track per inch (TPI) configurations. Reductions in servo track mis-registration, write head track width dimensions and read head track width dimensions are used to support BPR media and its higher TPI configurations. There are technology options available to improve servo track mis-registration, such as micro-actuators and sealed drives. Similarly, write head track width dimensional reduction may be alleviated by the introduction of shingled recording in which the write track width is larger than the final recorded data track width. However, there is currently no similar solution to alleviate the read track width reduction requirement.

SUMMARY

In one embodiment, a magnetic head includes a reader element adapted for reading data concurrently from at least two adjacent data tracks of a magnetic medium in a single pass, wherein the reader element has a width larger than a width of one data track in a track width direction, and wherein the at least two adjacent data tracks include bits that are arranged in a staggered orientation such that centers of any two bits from the at least two adjacent data tracks do not lie along a common line in a cross-track direction.

In another embodiment, a magnetic data storage system includes a bit patterned magnetic medium, wherein centers of bits in adjacent data tracks do not lie on a common line in a cross-track direction, at least one magnetic head having a writer element adapted for writing data successively to at least two adjacent data tracks of the magnetic medium, wherein the writer element has a width greater than a width of a data track in a track width direction and a reader element adapted for reading data concurrently from the at least two adjacent data tracks of the magnetic medium in a single pass, wherein the reader element has a width larger than the width of a data track in the track width direction, a drive mechanism for passing the magnetic medium over the at least one magnetic head, and a controller electrically coupled to the at least one magnetic head for controlling operation of the at least one magnetic head.

According to another embodiment, a method includes receiving data to be written to a magnetic medium, wherein adjacent track bits in the magnetic medium are arranged in a staggered orientation such that any two centers of the adjacent track bits do not lie along a common line in a cross-track direction, organizing the data to be written successively to adjacent data tracks of the magnetic medium such that the data is reproducible when read back from the adjacent data tracks concurrently, and writing the data successively to the adjacent data tracks, wherein the data is written such that data in adjacent data tracks is staggered.

Any of these embodiments may be implemented in a magnetic data storage system such as a disk drive system, which may include a magnetic head, a drive mechanism for passing a magnetic storage medium (e.g., hard disk over the head, and a control unit electrically coupled to the head for controlling operation of the head.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic head includes a reader element adapted for reading data concurrently from at least two adjacent data tracks of a magnetic medium in a single pass, wherein the reader element has a width larger than a width of one data track in a track width direction, and wherein the at least two adjacent data tracks include bits that are arranged in a staggered orientation such that centers of any two bits from the at least two adjacent data tracks do not lie along a common line in across-track direction.

In another general embodiment, a magnetic data storage system includes a bit patterned magnetic medium, wherein centers of bits in adjacent data tracks do not lie on a common line in a cross-track direction, at least one magnetic head having a writer element adapted for writing data successively to at least two adjacent data tracks of the magnetic medium, wherein the writer element has a width greater than a width of a data track in a track width direction and a reader element adapted for reading data concurrently from the at least two adjacent data tracks of the magnetic medium in a single pass, wherein the reader element has a width larger than the width of a data track in the track width direction, a drive mechanism for passing the magnetic medium over the at least one magnetic head, and a controller electrically coupled to the at least one magnetic head for controlling operation of the at least one magnetic head.

According to another general embodiment, a method includes receiving data to be written to a magnetic medium, wherein adjacent track bits in the magnetic medium are arranged in a staggered orientation such that any two centers of the adjacent track bits do not lie along a common line in a cross-track direction, organizing the data to be written successively to adjacent data tracks of the magnetic medium such that the data is reproducible when read back from the adjacent data tracks concurrently, and writing the data successively to the adjacent data tracks, wherein the data is written such that data in adjacent data tracks is staggered.

Figure 1:
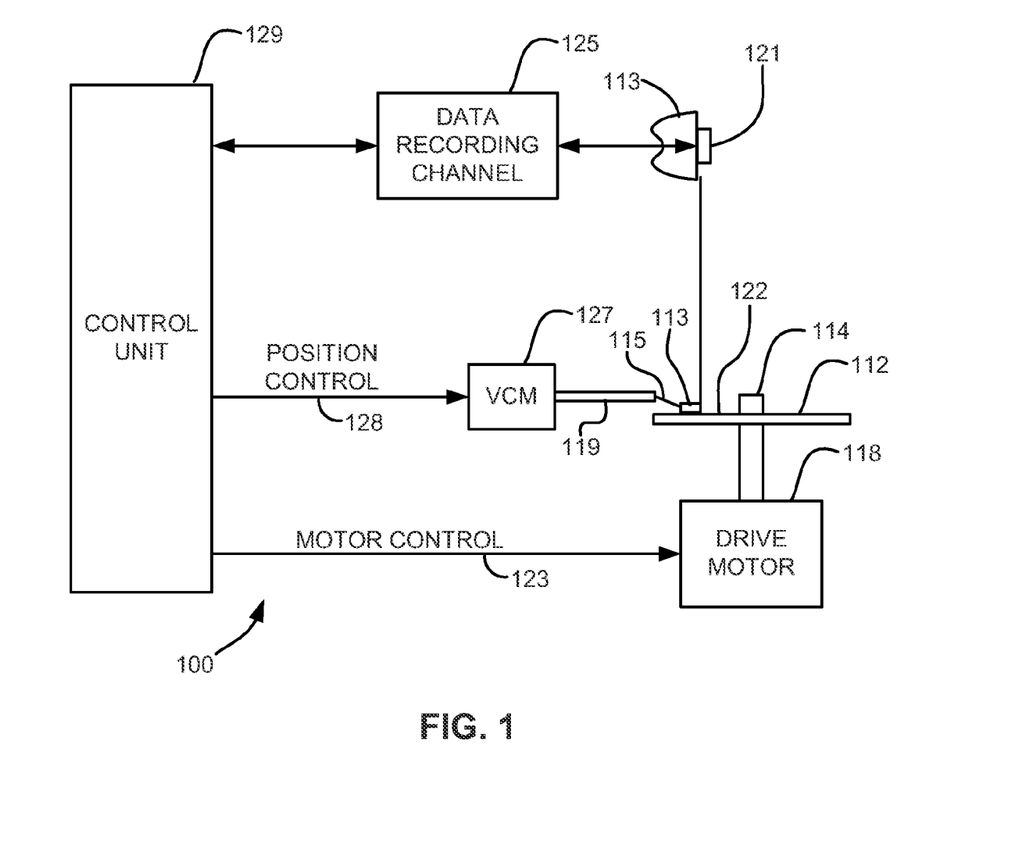
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts a upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion that extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
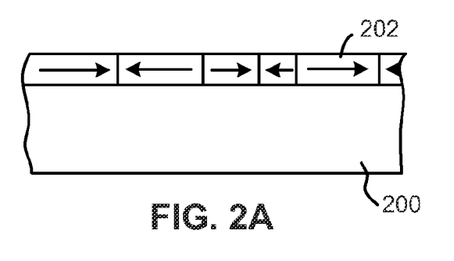
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses perpendicular or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
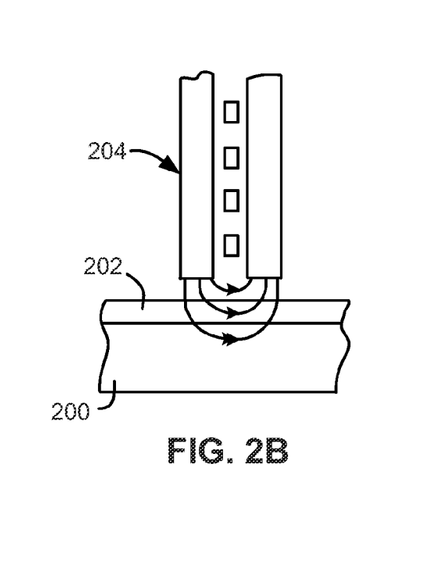
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
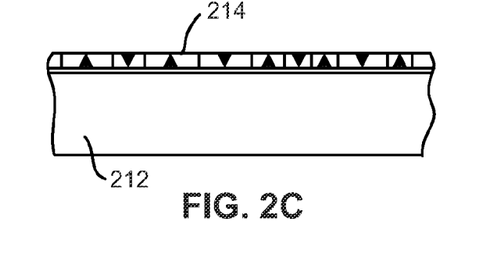
FIG. 2C is a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
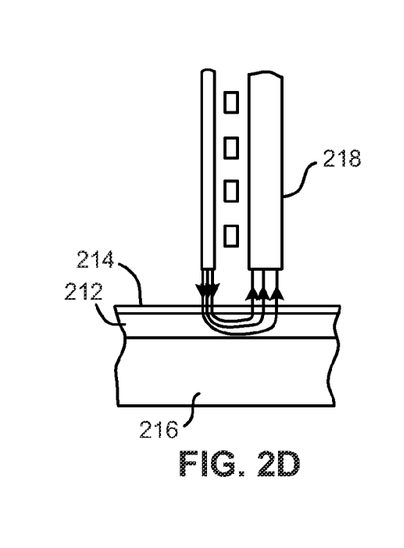
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
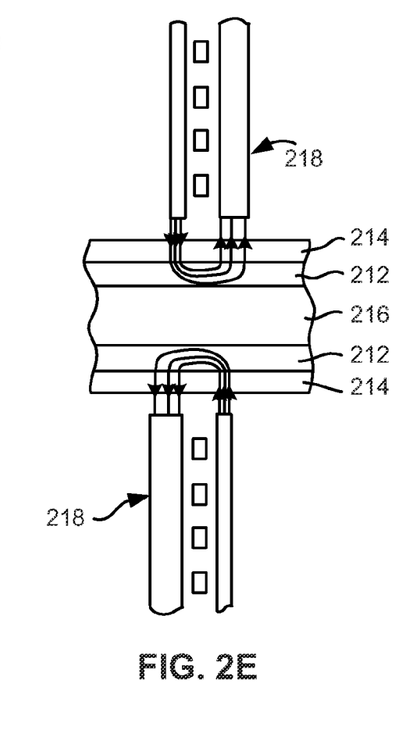
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
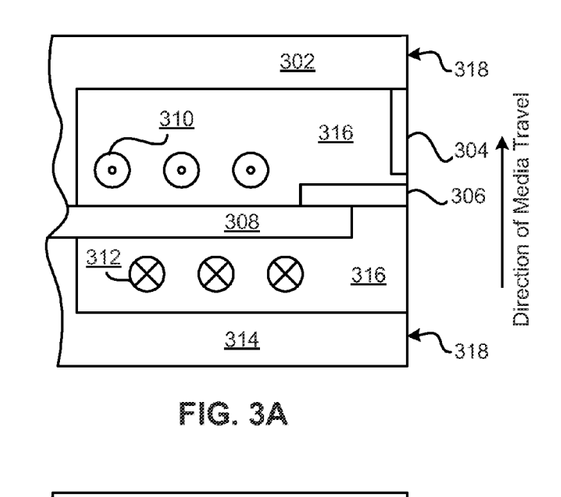
FIG. 3A is a cross-sectional view of one particular embodiment of a perpendicular magnetic head with helical coils.

FIG. 3A is a cross-sectional view of a perpendicular magnetic head. In FIG. 3A, helical cods 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
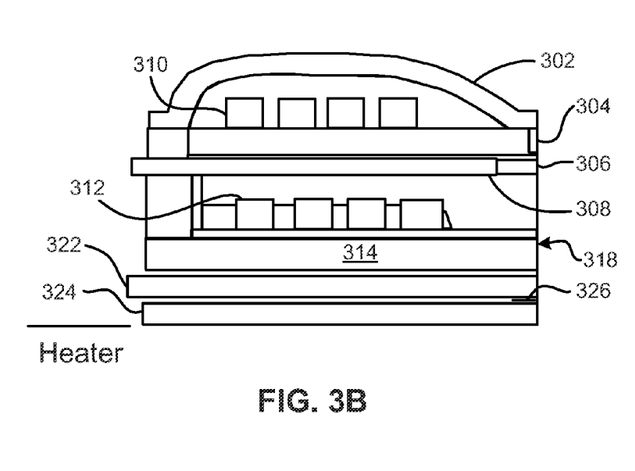
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor element 326 is typically positioned between the sensor shields 322, 324.

Figure 4A:
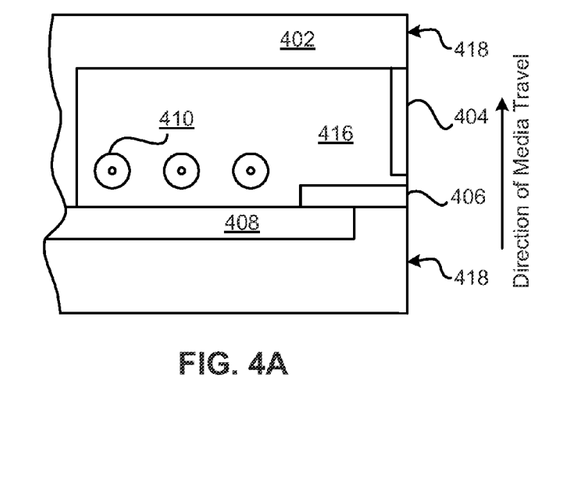
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
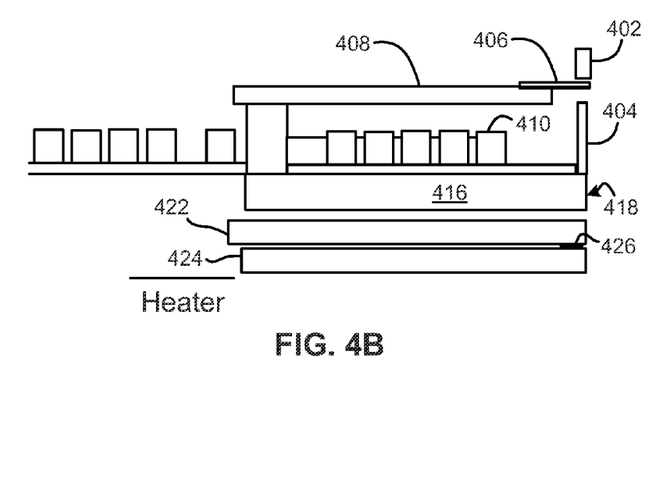
FIG. 4B is a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor element 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

In shingled recording systems, new data that is to be stored in a storage device, such as a HDD, is first written to a staging or buffer data zone area where data is not shingled. In this staging data zone area, the data may be readily manipulated and rearranged as needed. The density of data in a shingled data zone area is typically greater than about two times the density in the staging data zone area. Typically, the storage capacity of staging data zone areas is about 1% to about 5% of the total storage capacity of the drive, the rest of the capacity is stored in the shingled data zone areas.

With shingled recording, because the data is shingled to the magnetic medium, it cannot be written to a storage block directly. First, the data is staged in the staging data zone area (which may be considered a buffer zone), where enough data is accumulated to write it to the shingled data zone areas. Therefore, since the data is being staged for writing, the data may be written in a more sophisticated manner due to this staging step, as compared to conventional systems.

Figure 5A:
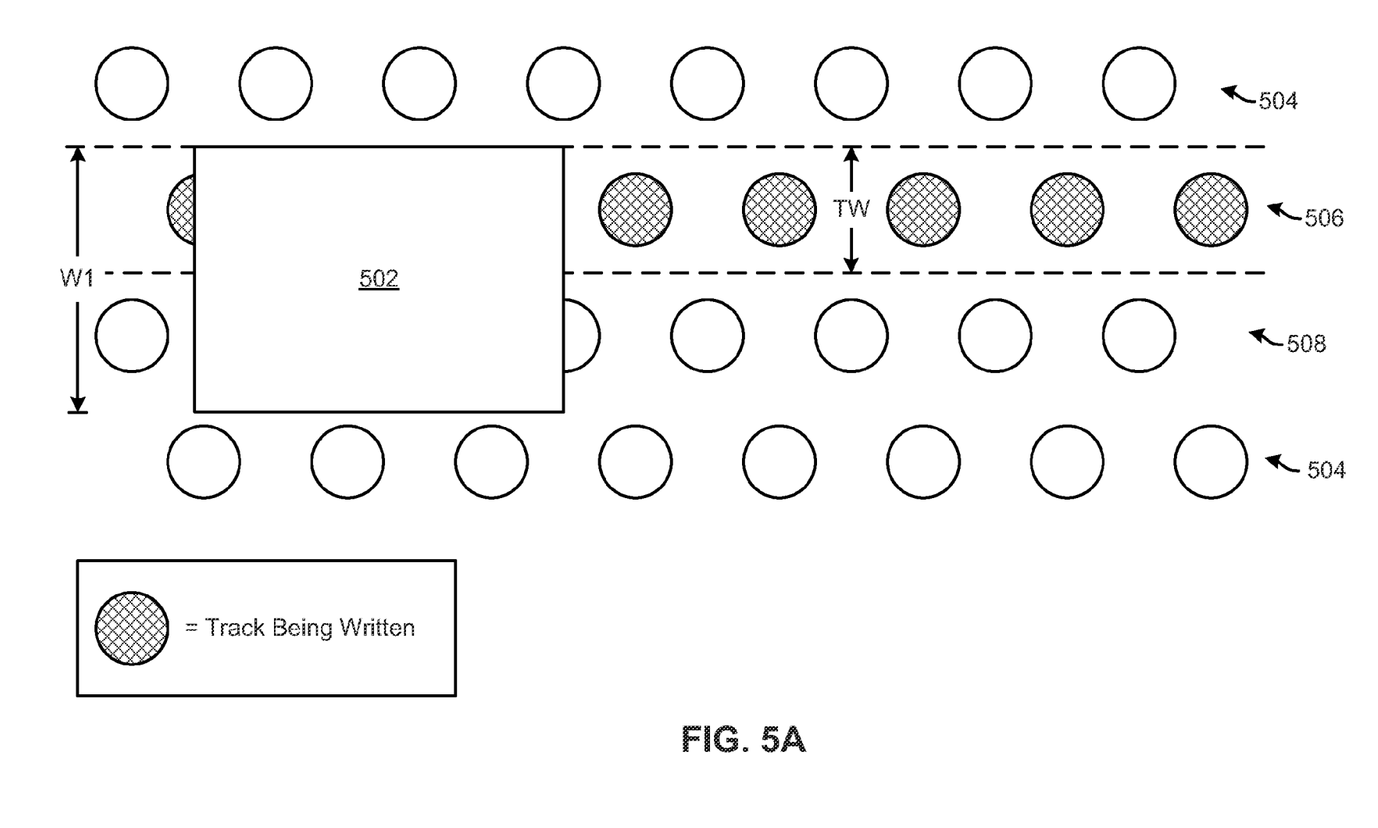
FIG. 5A shows a data track being written according to one embodiment.
Figure 5B:
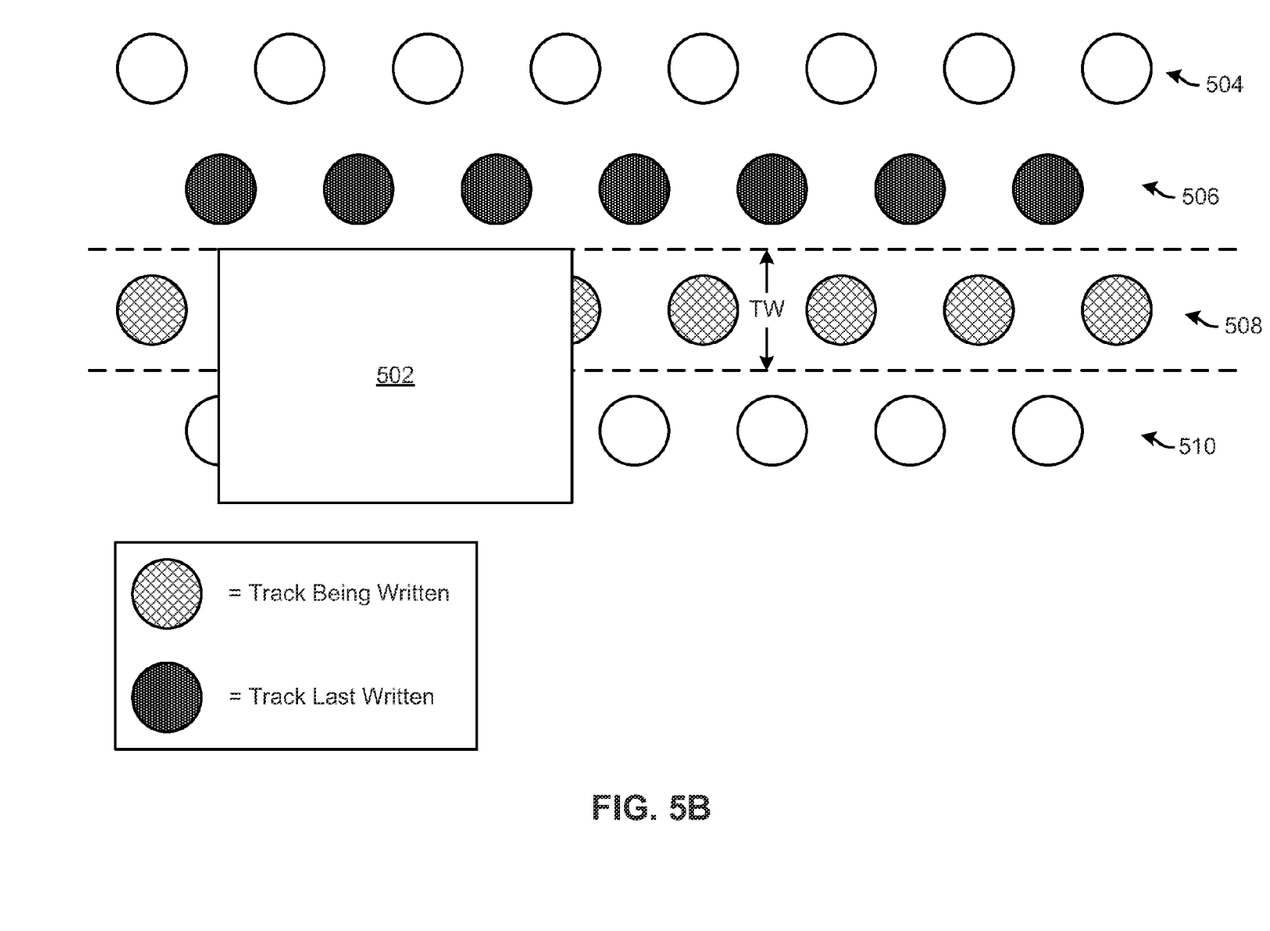
FIG. 5B shows a data track being written according to one embodiment.
Figure 5C:
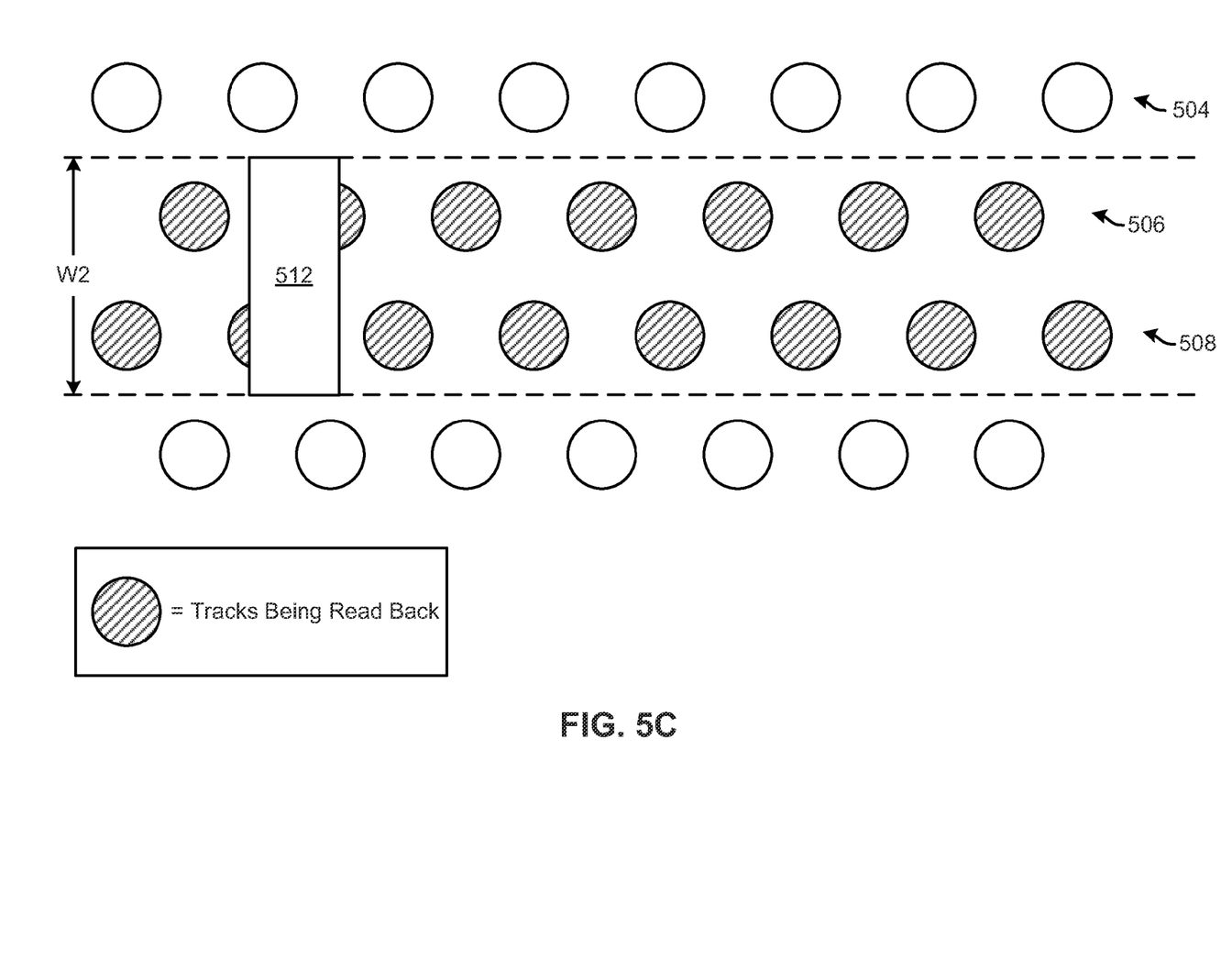
FIG. 5C shows multiple data tracks being read according to one embodiment.

After an adequate amount of data is gathered in this staging data zone area, the data is formatted as desired and re-written into the shingled data zone areas in large blocks of shingled data. Any size of blocks may be used, such as 4 KB, 8 KB, 32 KB, 64 KB, 128 KB, 1 MB, 2 MB, 32 MB, etc., as would be understood by one of skill in the art upon reading the present descriptions. According to one embodiment, the bit patterned recording (BPR) media is patterned no that bits in adjacent tracks are offset or staggered, as illustrated in FIGS. 5A-5C. This geometry is sometimes referred to as a hypertrack recording geometry and may employ shingled magnetic recording to store data.

In each of FIGS. 5A-5C, and elsewhere herein, bits are displayed as circles. However, as would be understood by one of skill in the art, the actual shape and size of individual bits may be different than it is portrayed here. For the sake of clarity, a center of any bit is referenced throughout as just the bit, since the actual orientation, size, and shape of the bit is inconsistent on the magnetic medium, generally, in each description herein, when bits are described as not being aligned in a cross-track direction, what is meant is that centers of the bits are not aligned in the cross-track direction, accounting for the effects of skew, as would be understood by one of skill in the art. By not being aligned in the cross-track direction, interference between the bits in adjacent tracks may be minimized when read by a reader which spans more than one track width.

The staging data zone area according to one embodiment is BPR, but is not shingled. It is a low density storage area for use to logically organize the data prior to writing it to the shingled data zone areas in large blocks of shingled data. The data is written to the staging data zone area in a way that it may be read back in a single pass. The data should be able to be manipulated easily, because it may be rearranged several times before being written back out to the shingled data zone areas.

The data that is written from the staging area is coded across two (or more) adjacent tracks in the shingled data zone area as illustrated in FIGS. 5A-5B. This may be referred to as a two pass write operation. For efficient data transfer, the minimum size of a data block written into the shingled data zone area from the staging zone may be set as two entire tracks worth of data, or more or less, according to various embodiments. Error correction and channel codes may be striped across the data tracks so that codes are functioning during a future single pass read back of the multiple written tracks. Furthermore, it is most efficient if each shingled block in the drive includes an even number of tracks.

However, in the event an odd number of tracks is advantageous for some reason, it should be noted that although the read head may read two tracks at a time, data on one subtrack may be ignored, disregarded, rejected, etc., allowing for an odd number of data tracks, in one embodiment. Formatting during writing may also be performed so as to handle a final odd track separately (using a single track format), according to another embodiment.

Referring now to FIG. 5A, instead of data to a single track, the data is written over multiple adjacent data tracks. Bits in any two adjacent data tracks are arranged in a staggered orientation such that centers of any bits from the two adjacent data tracks do not lie along a common line in a cross-track direction. That is to say, the bits in any two adjacent data tracks are staggered such that when reading the bits from the two adjacent tracks simultaneously, interference from one bit does not substantially affect the reading of the other bit. In other words, if two adjacent tracks are being written, a bit in the first track is positioned offset from a bit in the second track at all times, such that a center of two bits do not appear at the same time (to a reader spanning both tracks) in a cross-track direction, accounting for the effects of skew, as would be understood by one of skill in the art.

In one embodiment, a magnetic head comprises a writer element 502 for writing data to two adjacent data tracks. For example, a first data track 506 may be written and then a second data track 508 may be written successively, in series, etc., after shifting the writer element 502 by one track. The writer element 502 may be adapted for writing data successively to the at least two adjacent data tracks 506, 508 of the magnetic medium prior to being read from the magnetic medium. In one approach, the data is organized and parsed so that the writer writes a first portion of the data to the first track and subsequently writes a second portion of the data to the second track such that when the first and second tracks are read back concurrently, the data is logically organized. Also, the writer element 502 may have a width W1 greater than a width of one data track TW of the magnetic medium in a track width direction. During this writing operation, data in other data tracks 504 of the magnetic medium are not affected. However, because of the width of the writer element 502, the writer element 502 may overlap the second data track 508 while writing the first data track 506, with the first data track 506 being adjacent the second data track 508. Since the second data track 508 will be written over next, this does not adversely affect operation of the data storage system.

Now referring to FIG. 5B, writing to the second data track 508 is shown according to one embodiment. The writer element 502 has been shifted by one track so that it may now write data to the second data track 508. As shown, the writer element 502 may overlap a third data track 510 while writing the second data track 508, with the third data track 510 being adjacent the second data track 508.

The data is synchronized such that when the first data track 506 and second data track 508 are read back, both tracks may be read at the same time, as shown in FIG. 5C, so that reading may take place twice as fast as writing. This may be accomplished by staggering the bits in the first data track 506 and the second data track 508, as shown. Other techniques may also be employed, as would be understood to one of skill in the art upon reading the present descriptions. The advantage of this is that a sensor element twice the width of the data track may be used and thus alleviates the required reduction in dimensions of the read sensor technology to support high storage capacity drives.

According to one embodiment, a magnetic data storage system, such as that depicted in FIG. 1, for example, may comprise at least one magnetic head having a writer element, a reader element, or both, the magnetic medium (such as a bit patterned medium), a drive mechanism for passing the magnetic medium over the at least one magnetic head, and a controller electrically coupled to the at least one magnetic head for controlling operation of the at least one magnetic head.

Referring again to FIG. 5C, in one embodiment, the data may be logically split into at least two groups to be written to the at least two adjacent data tracks 506, 508 based on at least one of: an order of writing the data to the at least two adjacent data tracks, and an order of reading the data from the at least two adjacent data tracks. In one approach, a controller may logically split the data between the at least two adjacent data tracks prior to writing the data, the controller being coupled to the magnetic head. Of course, other factors may be considered in how the data is split between the at least two adjacent data tracks as would be understood by one of skill in the art upon reading the present descriptions.

With continued reference to FIG. 5C, a reader element 512 adapted for reading data concurrently from at least two adjacent data tracks 506, 508 of a magnetic medium in a single pass is shown according to one embodiment. The reader element 512 may be positioned above the at least two adjacent data tracks 506, 508 while reading the at least two adjacent data tracks 506, 508 concurrently, in one approach. The reader element 512 may have a width W2 larger than a width of one data track in a track width direction, as shown previously in FIG. 5A as TW, such as about the width of two data tracks, or more.

In addition, according to one embodiment and as shown in FIGS. 5A-5C, the data tracks 504 are offset, with the bits being 180° out of phase. Of course, if writing/reading will be performed on more than two adjacent tracks at a time, then the tracks may be offset accordingly, e.g., for three data tracks, the offset would be 120°, for four data tracks, the offset would be 90°, etc. This enables reading/writing from/to the data tracks while minimizing interference between the data tracks. This is possible using bit patterned recording media.

Two track width reading using hypertrack geometry and devices results in no loss in capacity. If the read width is increased to three or more tracks, a loss in capacity may be encountered as a result of increasing the spacing in the down track direction by about 33% to prevent overlapping of data bits during read back. In addition, skew effects become more pronounced with wider read widths. However, these configurations are possible using the embodiments and approaches described herein.

Figure 6A:
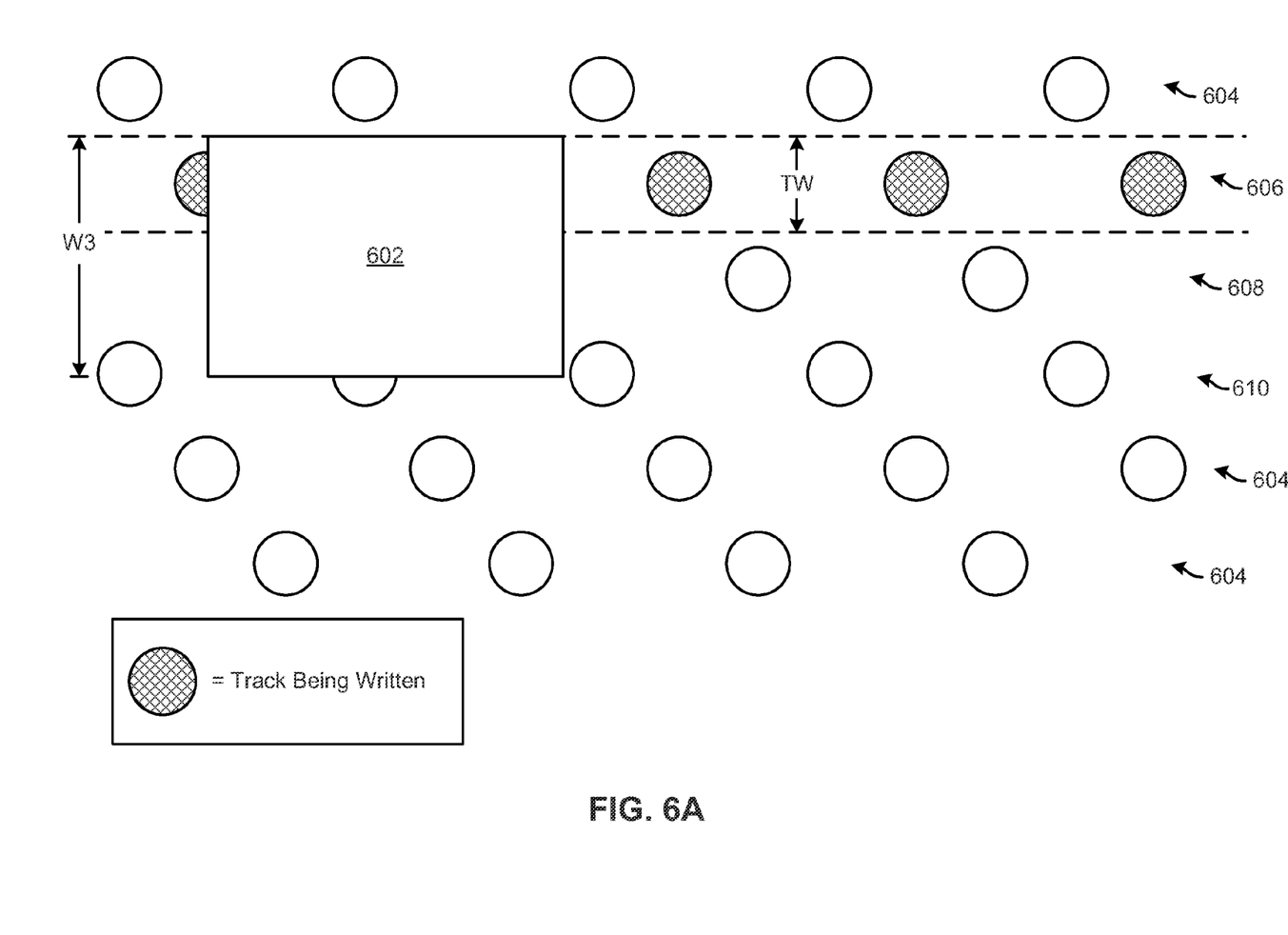
FIG. 6A shows a data track being written according to one embodiment.
Figure 6B:
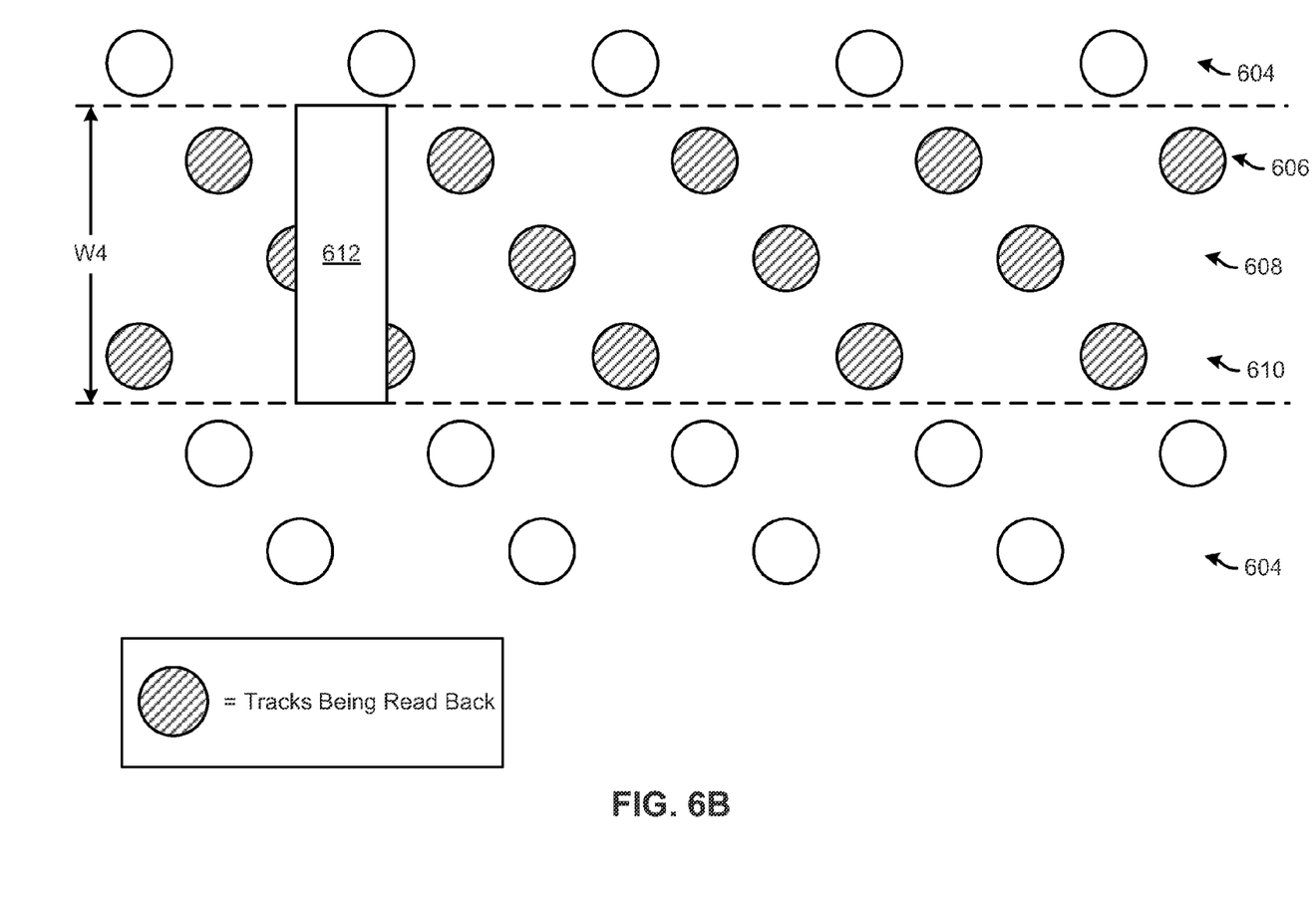
FIG. 6B shows multiple data tracks being read according to one embodiment.

As an example, referring to FIGS. 6A-6B, a triple pass write, single pass read system is shown, according to one embodiment. The system includes a writer element 602 adapted for writing data successively to three adjacent data tracks 606, 608, 610 of a magnetic medium, e.g., it takes three passes to write data to the tracks. The writer element 602 may have a width W3 greater than a width of a data track TW in a track width direction, such as about twice the width, about three times the width, etc. The magnetic medium may have tracks 604 arranged in a bit patterned format, according to one embodiment.

In some embodiments, the writer element 602 may overlap the second data track 608 (and in some embodiments, also the third data track 610 which is adjacent the second data track 608 and on a side of the second data track opposite the first data track 606) while writing the first data track 606. Also, when writing the second data track 608, the writer element 602 may overlap the third data track 610 (and in some embodiments, also a fourth data track), etc.

As shown in FIG. 6B, when reading data from the magnetic medium, a reader element 612 may be adapted for reading data concurrently from the three adjacent data tracks 606, 608, 610 of the magnetic medium in a single pass, wherein the reader element 612 has a width W4 larger than the width of a data track in the track width direction, as shown in FIG. 6A as TW.

According to one embodiment, before data is written to tracks of a magnetic medium, it is organized such that it may be written to at least two adjacent data tracks successively during at least two passes in a way which enables it to be read from the at least two adjacent data tracks concurrently in a single pass.

In one approach, data is organized such that when it is read from the at least two adjacent data tracks concurrently, the data from each of the at least two adjacent data tracks is interleaved to form one or more continuous data blocks. Logically when the tracks are read back, it's as if the at least two tracks are one track with a corresponding increase in the bit density, e.g., for two adjacent tracks—twice the bit density, for three adjacent tracks—three times the bit density, etc.

Accordingly, when data is received to be written to the magnetic medium, it is staged prior to being written and organized in some way. According to one embodiment, every other bit may be organized to two groups to be written to two adjacent data tracks. Of course, if more than two adjacent data tracks are to be read concurrently, then there will be a corresponding number of groups to split the data into before writing.

Once the data is organized, it may be written to the at least two data tracks successively in at least two passes of the writer element. In one example, if two adjacent data tracks will be read concurrently, then every other bit of the data is written to a first data track, and the other bit is written to a second data track. Then, when the data is read back, hits from the first data track are interleaved with bits from the second data track, to get twice the data rate.

According to any embodiment and/or approach described herein, the magnetic read head may be a current-perpendicular-to-plane (CPP) head, a current-in-plane (CAP) head, a tunneling magnetoresistive (TMR) head, a giant magnetoresistive (GMR) head, etc., or any other head as would be understood by one of skill in the art upon reading the present descriptions.

As shown in FIGS. 5A-6B, the magnetic head is shown without any skew. In most hard disk drives, there is a skew effect. An actuator positions the magnetic head so that it accesses the data on tracks from the inner diameter to the outer diameter. Therefore, in operation, the patterns shown would also be skewed from the inner diameter to the outer diameter in actual operation.

In one embodiment, the data is organized and logically assigned prior to being written to the magnetic medium such that the data will flow from the first track to the second track, and then on to any other tracks.

Figure 7:
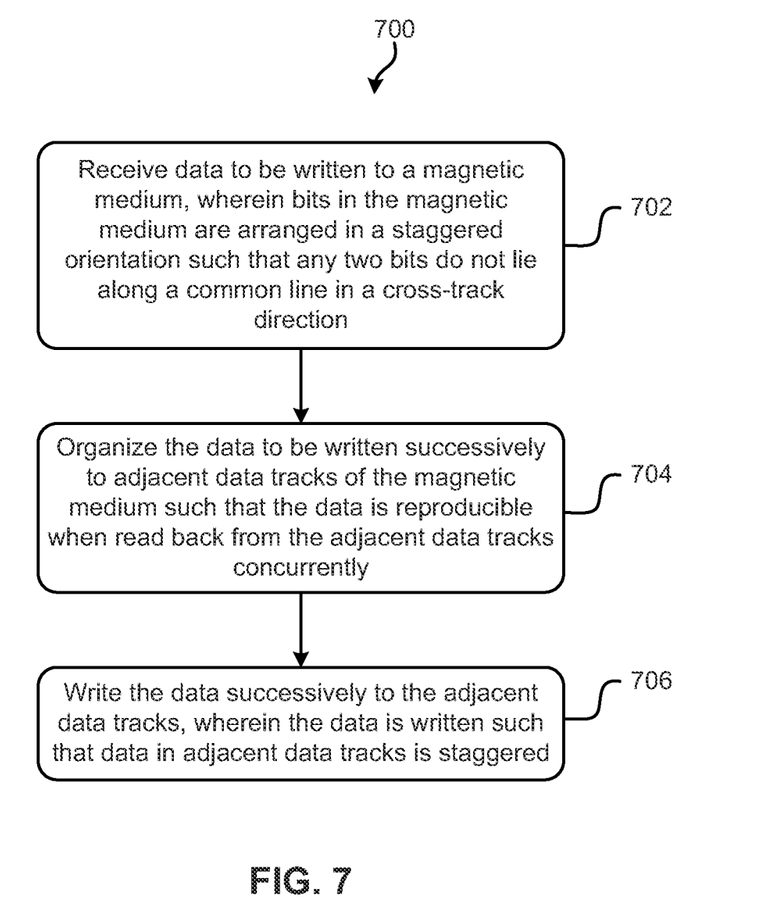
FIG. 7 shows a flowchart of a method, according to one embodiment.

Now referring to FIG. 7, a method 700 is shown according to one embodiment. The method 700 may be carried out in any desired environment, including those shown and described in FIGS. 1-68, according to various embodiments. The method 700 may include more or less operations than those described in accordance with FIG. 7.

In operation 702, data is received to be written to a magnetic medium. In one approach, the magnetic medium may be bit patterned.

In another embodiment, bits in the magnetic medium may be arranged in a staggered orientation such that any two bits do not lie along a common line in a cross-track direction.

In other embodiments, a controller of a magnetic head may receive the data to be written, a processor may receive the data, etc., or any other receiving device or module as would be understood by one of skill in the art upon reading the present descriptions.

In operation 704, the data is organized to be written successively to adjacent tracks of the magnetic medium such that the data is reproducible when read back from the adjacent tracks concurrently. Two or more adjacent tracks may be written successively, according to various embodiments, such as two, three, four, etc.

According to one embodiment, organizing the data may comprise splitting the data into a first group and a second group, the first group to be written to a first track, and the second group to be written to a second track of the adjacent tracks.

In another embodiment, organizing the data may comprise logically splitting the data into at least two groups to be written to at least two adjacent data tracks based on at least one of: an order of writing the data to the at least two adjacent data tracks and an order of reading the data from the at least two adjacent data tracks.

In one approach, the first group data may be written to the first data track in a first pass and the second group data may be written to the second data track in a second pass. In this approach, none of the first group data lies on a common line in a cross-track direction with any of the second group data after being written, accounting for the effects of skew as would be understood by one of skill in the art.

In operation 706, the data is written successively to the adjacent data tracks according to the organization of the data. In one embodiment, the data is written such that data in adjacent data tracks is staggered. For example, bits of data may be written alternatively between two tracks such that when the tracks are read back concurrently, the data is read back in logical sequence and does not need further processing to be understood.

In one embodiment, the data may be written successively to the adjacent data tracks using shingled magnetic recording. Furthermore, the magnetic medium may be bit patterned.

In one embodiment, the writing may be performed using a writer element of a magnetic head, with a width of the writer element being greater than a width of a data track in a track width direction. In one example, the width of the writer element may be at least about a width of two data tracks in a track width direction. In a further approach, the writer element may be overlapped with the second data track while writing the first data track. Furthermore, the writer element may be overlapped with a third data track while writing the second data track, with the third data track being adjacent the second data track opposite the first data track.

According to one embodiment, the method 700 may further comprise reading the data from the adjacent data tracks concurrently in a single pass.

In another embodiment, the first group data may be read from the first data track and the second group data may be read from the second data track in a single pass using a reader element, a sensor element of a magnetic head, etc. in a further embodiment, a width of the sensor or reader element may be at least about a width of two data tracks in a track width direction. The sensor element may be positioned above the first and second data tracks while reading the first and second data tracks, and the data may be read from the adjacent data tracks in a single pass.

Therefore, when the HDD has free time, available processing capacity, etc., it offloads data from the staging zone to the shingled recording zone areas, so the user does not see any apparent performance impact. If a large fraction of the free time is used to offload data, there might be some impact, e.g., the HDD might be busy doing this when the user asks it to do something else. So there is some potential impact, but it may not have any actual downstream effect on most users and/or applications.

For subsequent reading of the data, the read head is designed to be wide enough to read two tracks worth of data at a time so that the read process occurs in one pass, as shown in FIGS. 5C and 6B, albeit at a multiple of the data rate as compared to the write process (e.g, twice the data rate, triple the data rate, etc.). This also allows the read head width to be twice the written data track and gives reader track width relief similar to what was gained for the write head track width with shingled writing. This architecture has almost no impact to performance in existing shingled HDD, other than those described herein.

Other added benefits of this architecture include that the write process has more margin for error due to lower bit per inch (BPI) operation. The write process is more critical since incorrectly written data is much harder to recover than poorly read data. Also, the read process has twice the data rate so performance is enhanced when a data retrieve command requests data not located in the unshingled buffer content area and requires the reading of data located in the shingled zones.

In more embodiments, the embodiments and approaches described herein may be implemented in other HDD recording technologies, such as current perpendicular magnetic recording, thermal assisted recording, microwave assisted magnetic recording, etc. These recording technologies may be employed as long the adjacent data bits are written with the same staggered formation as described herein with BPR to enable two track width reading (or greater) by the read sensor with acceptable read interference between adjacent tracks. However, since these additional technologies are based on continuous media, they do not have the dead area (spaces) between the data bits as in BPR, and thus the adjacent track interference effects will be more pronounced than when used with BPR. However, this in no way limits the application of the embodiments and approaches described herein to these recording technologies.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic data storage system, comprising:
a magnetic head, comprising:
a writer element configured to write data successively to at least two adjacent data tracks of a magnetic medium prior to being read from the magnetic medium, wherein the writer element has a width greater than a width of one data track of the magnetic medium in a track width direction, wherein the at least two adjacent data tracks comprise bits that are arranged in a staggered orientation such that centers of any two bits from the at least two adjacent data tracks do not lie along a common line in a cross-track direction, wherein the data is split into a first group and a second group prior to writing, and wherein the writer element writes data to the staggered bits across the at least two adjacent data tracks in an alternating fashion by writing the first group data to a first data track in a first pass and writing the second group data to a second data track in a second pass, the first data track being adjacent the second data track; and
a reader element configured to read data concurrently from the at least two adjacent data tracks of the magnetic medium in a single pass, wherein the reader element has a width larger than the width of one data track in the track width direction; and
a controller electrically coupled to the magnetic head for controlling operation of the magnetic head, the controller being configured to cause the writer element to write data successively to at least two adjacent data tracks of the magnetic medium by writing a first group of the data to a first data track in a first pass and writing a second group of the data to a second data track in a second pass, wherein the first data track is adjacent the second data track, and wherein none of the first group of the data lies on a common line in a cross-track direction with any of the second group of the data.

2. The magnetic data storage system as recited in claim 1, wherein the width of the writer element is at least about a width of two adjacent data tracks in the track width direction.

3. The magnetic data storage system as recited in claim 1, further comprising:
the magnetic medium; and
a drive mechanism for passing the magnetic medium over the magnetic head.

4. The magnetic data storage system as recited in claim 3, wherein the controller is configured to logically split the data into at least two groups to be written to the at least two adjacent data tracks based on at least one of: an order of writing the data to the at least two adjacent data tracks, and an order of reading the data from the at least two adjacent data tracks.

5. A magnetic data storage system, comprising:
- a bit patterned magnetic medium, wherein centers of bits in adjacent data tracks do not lie on a common line in a cross-track direction;
- at least one magnetic head, comprising:
    - a writer element configured to write data successively to at least two adjacent data tracks of the magnetic medium by writing a first group of the data to a first data track in a first pass and writing a second group of the data to a second data track in a second pass, wherein the first data track is adjacent the second data track, and wherein none of the first group of the data lies on a common line in a cross-track direction with any of the second group of the data, wherein the writer element has a width greater than a width of a data track in a track width direction; and
    - a reader element configured to read data concurrently from the at least two adjacent data tracks of the magnetic medium in a single pass, wherein the reader element has a width larger than the width of a data track in the track width direction;
- a drive mechanism for passing the magnetic medium over the at least one magnetic head; and
- a controller electrically coupled to the at least one magnetic head for controlling operation of the at least one magnetic head, the controller being configured to cause the writer element to write data successively to at least two adjacent data tracks of the magnetic medium by writing a first group of the data to a first data track in a first pass and writing a second group of the data to a second data track in a second pass,
- wherein the first data track is adjacent the second data track,
- wherein none of the first group of the data lies on a common line in a cross-track direction with any of the second group of the data, and
- wherein the data is written successively to the adjacent data tracks using shingled magnetic recording.

6. The magnetic data storage system as recited in claim 5, wherein the controller is configured to logically split data to be written to the magnetic medium into at least two groups to be written to the at least two adjacent data tracks based on at least one of: an order of writing the data to the at least two adjacent data tracks, and an order of reading the data from the at least two adjacent data tracks.

7. The magnetic data storage system as recited in claim 5, wherein the controller is configured to organize data to be written to the magnetic medium such that the data is written successively to the at least two adjacent tracks of the magnetic medium and read from the at least two adjacent data tracks of the magnetic medium in a single pass.

8. The magnetic data storage system as recited in claim 5, wherein the writer element overlaps a second data track while writing a first data track, wherein the first data track is adjacent the second data track.

9. The magnetic data storage system as recited in claim 8, wherein the writer element overlaps a third data track while writing the second data track, wherein the second data track is adjacent the third data track.

10. The magnetic data storage system as recited in claim 5, wherein the reader element is positioned above the at least two adjacent data tracks while reading the at least two adjacent data tracks concurrently.

11. The magnetic data storage system as recited in claim 5, wherein the magnetic data storage system employs shingled magnetic recording to store data.

12. A method, comprising:
- receiving data to be written to a magnetic medium, wherein adjacent track bits in the magnetic medium are arranged in a staggered orientation such that any two centers of the adjacent track bits do not lie along a common line in a cross-track direction;
- organizing the data to be written successively to adjacent data tracks of the magnetic medium such that the data is reproducible when read back from the adjacent data tracks concurrently, wherein organizing the data comprises splitting the data into a first group and a second group; and
- writing the data successively to the adjacent data tracks, wherein the data is written such that data in adjacent data tracks is staggered, and wherein writing the data comprises:
    - writing the first group data to a first data track in a first pass; and
    - writing the second group data to a second data track in a second pass, wherein the first data track is adjacent the second data track, and wherein none of the first group data lies on a common line in a cross-track direction with any of the second group data.

13. The method as recited in claim 12, wherein organizing the data further comprises splitting the data into a third group, wherein writing the data further comprises writing the third group data to a third data track in a third pass, and wherein the third track is adjacent the second track.

14. The method as recited in claim 12, further comprising overlapping a writer element with the second data track while writing the first data track.

15. The method as recited in claim 14, further comprising overlapping the writer element with a third data track while writing the second data track, wherein the third data track is adjacent the second data track opposite the first data track.

16. The method as recited in claim 12, further comprising reading the first group data from the first data track and the second group data from the second data track in a single pass.

17. The method as recited in claim 16, wherein the reading is performed using a sensor element of a magnetic head, and wherein a width of the sensor element is at least about a width of two data tracks in a track width direction.

18. The method as recited in claim 17, wherein the sensor element is positioned above the first and second data tracks while reading the first and second data tracks.

19. The method as recited in claim 12, further comprising reading the data from the adjacent data tracks concurrently in a single pass.

20. The method as recited in claim 12, wherein the writing is performed using a writer element of a magnetic head, and wherein a width of the writer element is greater than a width of a data track in a track width direction.

21. The method as recited in claim 20, wherein the width of the writer element is at least about a width of two data tracks in a track width direction.

22. The method as recited in claim 12, wherein organizing the data comprises logically splitting the data into at least two groups to be written to at least two adjacent data tracks based on at least one of: an order of writing the data to the at least two adjacent data tracks and an order of reading the data from the at least two adjacent data tracks.

23. The method as recited in claim 12, wherein the data is written successively to the adjacent data tracks using shingled magnetic recording.

24. The method as recited in claim 12, wherein the magnetic medium is bit patterned.

* * * * *

UNITED STATES PATENT AND TRADEMARK OFFICE
CERTIFICATE OF CORRECTION

PATENT NO.       : 8,786,969 B2                                     Page 1 of 1
APPLICATION NO.  : 13/251031
DATED            : July 22, 2014
INVENTOR(S)      : Kasiraj et al.

It is certified that error appears in the above-identified patent and that said Letters Patent is hereby corrected as shown below:

In the specification:

col. 3, line 32 replace "across-track" with --a cross-track--;

col. 4, line 17 replace "a" with --an--;

col. 5, line 49 replace "cods" with --coils--;

col. 6, line 59 replace "no" with --so--;

col. 7, line 3 replace "generally, in" with --generally. In--;

col. 7, line 41 replace "of data" with --of writing data--;

col. 8, line 12 replace "58" with --5B--;

col. 9, line 57 replace "to two" with --into two--;

col. 10, line 1 replace "hits" with --bits--;

col. 10, line 6 replace "(CAP)" with --(CIP)--;

col. 10, line 25 replace "1-68," with --1-6B,--;

col. 11, line 24 replace "etc. in" with --etc. In--.

Signed and Sealed this
Fourteenth Day of October, 2014

Michelle K. Lee
*Deputy Director of the United States Patent and Trademark Office*